Feb. 15, 1955     F. W. MEREDITH     2,701,969
CASING FOR DIAL READING INSTRUMENTS
Filed July 14, 1950
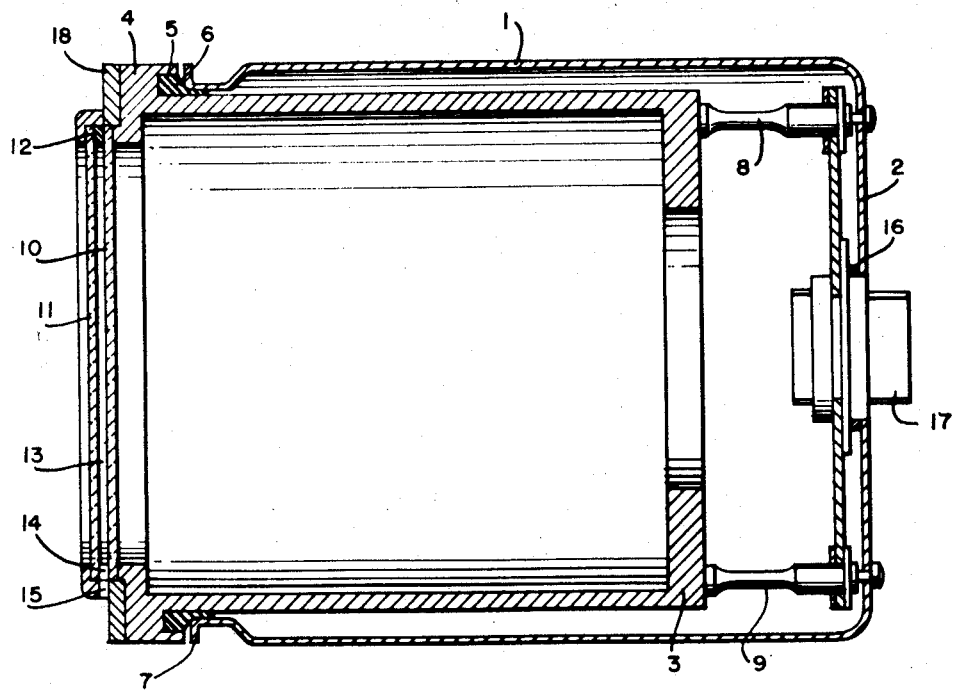
INVENTOR
F. W. MEREDITH
BY *Moore & Hall*
ATTORNEYS / 2,701,969
Patented Feb. 15, 1955

2,701,969
CASING FOR DIAL READING INSTRUMENTS

Frederick William Meredith, Cricklewood, London, England, assignor to S. Smith & Sons (England) Limited, London, England Application July 14, 1950, Serial No. 173,851

Claims priority, application Great Britain July 28, 1949

4 Claims. (Cl. 73—431)

This invention relates to dial reading instruments which are subject to wide variations of temperature. It is thus particularly applicable to instruments for use in aircraft, such as for example, directional gyroscopes, artificial horizons.

In such instruments, difficulty has been experienced in the past by reason of the fact that upon fairly rapid transfer from surroundings of one temperature to surroundings of a considerably lower temperature (e. g. in a rapidly climbing aircraft), condensation of moisture has occurred upon the window through which the indication provided by the instrument is to be viewed, thereby rendering reading of the instrument difficult or even impossible and condensation of moisture has also occurred upon the instrument mechanism which is in good thermal contact with its surroundings and therefore closely following any change in temperature.

It is the object of the present invention to provide a case for an instrument of the type referred to in which the defects mentioned above are largely overcome.

According to the present invention a casing for a dial reading instrument comprises an outer wall consisting as to a substantial part thereof of material of high thermal conductivity, said wall having an outer surface with good thermally radiative properties and an inner surface of poor thermally radiative properties, a support for the mechanism of an instrument substantially thermally insulated from the aforesaid part of the outer wall, a window provided in the outer wall for viewing the indication provided by an instrument mounted on the aforesaid support, said window comprising at least two sheets of transparent material spaced apart, whereby upon a substantial fall in the temperature of the surroundings of the casing any condensation of moisture occurs upon the interior of the high conductivity portion of the outer wall rather than on the interior surface of the window or upon the mechanism of an instrument mounted upon the support.

Preferably the above mentioned inner surface is polished.

An embodiment of the invention, in which it is applied to the provision of a case suitable for an instrument such as for example, a gyroscopic artificial horizon will now be described with reference to the accompanying drawing.

The outer wall of the case consists, as to its greater part, of a cylinder 1 formed from metal sheet, preferably aluminium, closed at one end, as shown at 2, and open at the other end and blackened externally and polished internally. A light alloy framework 3 is provided, which is adapted to support the instrument within the casing. The framework is provided at one end with a flange 4 by means of which the instrument and casing can be mounted in a panel in a conventional manner. The flange 4 is provided with an annular groove 5 containing a gasket 6 of thermally insulating material, against which butts the open end of the cylinder 1, as shown at 7. Bolts, as at 8 and 9, are provided joining the framework 3 to the closed end 2 of the cylinder, whereby the open end of the cylinder 1 shown at 7 may be forced into contact with the gasket 6, thus producing a substantially airtight joint.

Mounted on the front of the flange, by means of the bezel 18, are two glass discs 10, 11, forming a window for viewing the instrument mounted in the case, spaced apart by a thin washer 12 to provide a small air space between them. This air space is allowed to communicate with the atmosphere by means of a small split 14 in the washer 12 and a small hole 15 in the bezel 18. In the end 2 of the cylinder there is fitted a plug 17 by means of which connection may be made to an instrument within the casing. The joint between plug and casing is rendered airtight by means of a further gasket 16.

It will be seen that upon the occurrence of a fall in temperature of the surroundings of the casing an appreciable difference of temperature is rapidly established between the outer wall 1, and the framework 3, glass 10 etc. Thus any condensation of the moisture inevitably present inside the case occurs, not on the glass 10, the framework 3 or any instrument mounted within the casing, but upon the surface of the cylinder 1 where it will affect neither the viewing of the instrument nor its operation.

I claim:
1. A casing for a dial reading instrument comprising a cylindrical metal portion closed at one end and open at the other, said portion being blackened externally and polished internally, an instrument support within said cylindrical metal portion, said instrument support being provided with a flange, means to retain said flange in engagement with the wall of the said cylindrical metal portion adjacent its open end in an airtight manner and thermally insulated therefrom, and a window supported by said flange, the plane of said window being normal to the axis of the aforesaid cylindrical portion, said window comprising two similar sheets of transparent material with an air space therebetween and a bezel to secure the aforesaid sheets to the flange, whereby upon a substantial fall in tha temperature of the surroundings of the casing any condensation of moisture accurs upon the said cylindrical metal portion rather than upon the instrument carried by said support.

2. A casing for a dial reading instrument comprising an outer wall of high thermal conductivity adapted to surround the instrument mechanism and having an open end, said outer wall having an outer surface of good thermally radiative properties and an inner surface of poor thermally radiative properties, an instrument support within said outer wall and substantially thermally insulated therefrom, one end of said support projecting from the open end of said outer wall, a window provided in the projecting portion of said support for viewing the indication provided by an instrument mounted on said support, said window comprising at least two sheets of transparent material spaced apart, whereby upon a substantial fall in the temperature of the surroundings of the casing any condensation of moisture occurs upon the interior of the high conductivity portion of the outer wall rather than on the inner surface of the window.

3. A casing for a dial reading instrument comprising an outer wall of high thermal conductivity adapted to surround the instrument mechanism and having an open end, said outer wall having an outer surface of good thermally radiative properties and a polished inner surface, an instrument support within said outer wall and substantially thermally insulated therefrom, one end of said support projecting from the open end of said outer wall, a window provided in the projecting portion of said support and in substantially airtight relation therewith for viewing the indication provided by an instrument mounted on said support, said window comprising at least two sheets of transparent material spaced apart, whereby upon a substantial fall in the temperature of the surroundings of the casing any condensation of moisture occurs upon the interior of the high conductivity portion of the outer wall rather than upon the interior surface of the window.

4. The structure of claim 2 in which said window is mounted in substantially airtight relation with said support, and means to mount said instrument support in airtight relationship with said outer wall.

References Cited in the file of this patent
UNITED STATES PATENTS

| | | |
|---|---|---|
| 1,708,935 | Christopher | Apr. 16, 1929 |
| 1,925,999 | De Giers | Sept. 5, 1933 |
| 2,467,412 | Wathen | Apr. 19, 1949 |